(12) United States Patent
Gutgsell et al.

(10) Patent No.: US 10,738,226 B2
(45) Date of Patent: Aug. 11, 2020

(54) SINGLE-COMPONENT THERMOSETTING EPOXY RESIN WITH IMPROVED ADHESION

(71) Applicant: SIKA TECHNOLOGY AG, Baar (CH)

(72) Inventors: Michael Gutgsell, Uster (CH); John Hanley, IV, Sterling Heights, MI (US)

(73) Assignee: SIKA TECHNOLOGY AG, Baar (CH)

( * ) Notice: Subject to any disclaimer, the term of this patent is extended or adjusted under 35 U.S.C. 154(b) by 27 days.

(21) Appl. No.: 16/064,125

(22) PCT Filed: Jan. 12, 2017

(86) PCT No.: PCT/EP2017/050608
§ 371 (c)(1),
(2) Date: Jun. 20, 2018

(87) PCT Pub. No.: WO2017/121826
PCT Pub. Date: Jul. 20, 2017

(65) Prior Publication Data
US 2019/0055439 A1  Feb. 21, 2019

(30) Foreign Application Priority Data

Jan. 13, 2016 (EP) .................................... 16151133

(51) Int. Cl.
| | | |
|---|---|---|
| *C09J 163/00* | (2006.01) | |
| *C08G 59/40* | (2006.01) | |
| *C08G 59/42* | (2006.01) | |
| *C08G 59/20* | (2006.01) | |
| *C09J 5/06* | (2006.01) | |
| *C09J 11/08* | (2006.01) | |
| *C09J 175/08* | (2006.01) | |

(52) U.S. Cl.
CPC ............ *C09J 163/00* (2013.01); *C08G 59/20* (2013.01); *C08G 59/40* (2013.01); *C08G 59/42* (2013.01); *C08G 59/4223* (2013.01); *C09J 5/06* (2013.01); *C09J 11/08* (2013.01); *C09J 175/08* (2013.01); *C09J 2421/00* (2013.01); *C09J 2463/00* (2013.01); *C09J 2475/00* (2013.01)

(58) Field of Classification Search
CPC .................................................... C09J 163/00
See application file for complete search history.

(56) References Cited

U.S. PATENT DOCUMENTS

| | | | |
|---|---|---|---|
| 5,707,439 A | 1/1998 | Takekoshi et al. | |
| 6,197,849 B1 | 3/2001 | Zilg et al. | |
| 6,322,890 B1 | 11/2001 | Barron et al. | |
| 7,786,214 B2 * | 8/2010 | Kramer | C08G 18/10 525/65 |
| 2012/0041101 A1 * | 2/2012 | Spyrou | C08G 59/4014 523/400 |

FOREIGN PATENT DOCUMENTS

| | | |
|---|---|---|
| CN | 103952109 A | 7/2014 |
| EP | 1152019 A1 | 11/2001 |
| EP | 2450470 A1 | 5/2012 |
| WO | 2010/124901 A1 | 11/2010 |
| WO | 2013/160870 A1 | 10/2013 |

OTHER PUBLICATIONS

Jul. 17, 2018 International Preliminary Report on Patentability issued in International Patent Application No. PCT/EP2017/050608.
Mar. 14, 2017 International Search Report issued in International Patent Application No. PCT/EP2017/050608.
Apr. 21, 2020 Office Action issued in Chinese Patent Application No. 201780005649.4.

* cited by examiner

*Primary Examiner* — Daniel H Lee
(74) *Attorney, Agent, or Firm* — Oliff PLC

(57) ABSTRACT

A one-component heat-curing epoxy resin adhesive has at least one epoxy resin having an average of more than one epoxy group per molecule; at least one latent hardener for epoxy resins; and at least one carboxylic acid selected from substituted or unsubstituted adipic acid, substituted or unsubstituted succinic acid, substituted or unsubstituted phthalic acid, substituted or unsubstituted terephthalic acid, substituted or unsubstituted isophthalic acid, substituted or unsubstituted benzenetricarboxylic acid and substituted or unsubstituted nitrobenzoic acid, excluding 2-hydroxysuccinic acid and 2,3-dihydroxysuccinic acid as carboxylic acid, and wherein the epoxy resin adhesive contains 0.0015 to 0.04 mol of the at least one carboxylic acid per 100 g of the epoxy resin adhesive and the epoxy resin adhesive has a viscosity of 500-5000 Pas at 25° C. The epoxy resin adhesive is notable for a very heat-resistant bond on particular metal substrates such as steel having a zinc-magnesium coating.

16 Claims, 1 Drawing Sheet

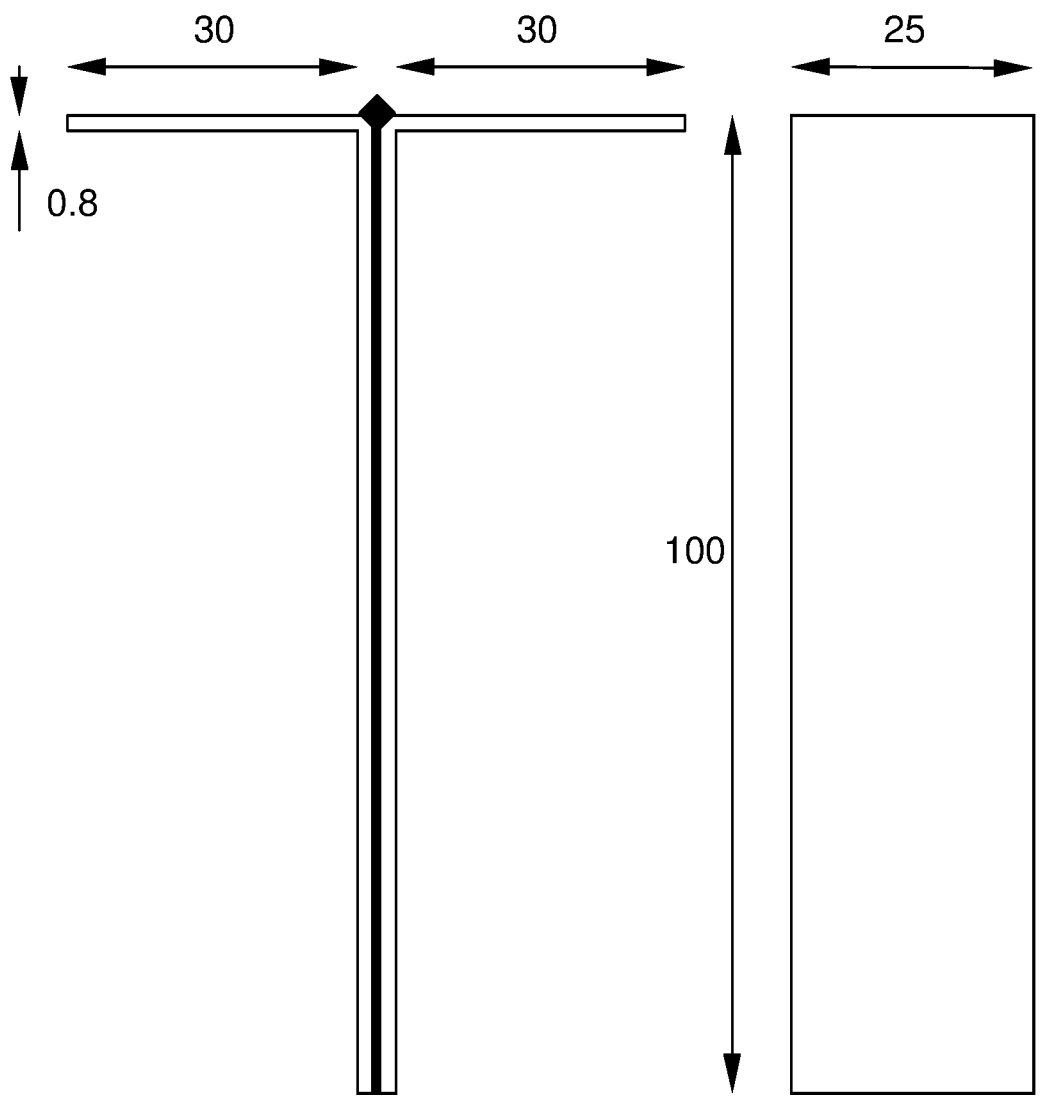

SINGLE-COMPONENT THERMOSETTING EPOXY RESIN WITH IMPROVED ADHESION

TECHNICAL FIELD

The invention relates to the field of the heat-curing epoxy adhesives.

STATE OF THE ART

One-component heat-curing epoxy adhesives are frequently used for bonding of metal substrates such as steel sheets when high strengths are required, for example in automobile construction.

Steel sheets having a coating of zinc-magnesium (ZM) are among the fastest-growing group of steel products. In many applications, they offer distinctly better corrosion resistance than sheets having zinc coatings that have been customary to date. However, bonding of heat-curing epoxy adhesives on zinc-magnesium surfaces at elevated temperature, for example 80° C., is poor. In the peel test at 80° C., adhesive fracture failure was found.

WO 2013/160870 describes a method in which a steel sheet having a zinc-magnesium coating is treated with an acidic solution. The acidic solution contains an aminosilane or an epoxysilane. The pretreatment with the silane-containing acidic solution improves the adhesion of an adhesive on the zinc-magnesium surface. However, this means an additional production step for the steel manufacturer, which is associated with extra costs.

At present, it is not known how the adhesion problem on ZM mentioned can be solved from the adhesives side. A solution on the adhesives side would avoid this production step in that it would become unnecessary.

Metal substrates where problems with the adhesion of epoxy resin adhesives under hot conditions are likewise possible are, for example, cold-rolled steel, aluminium or aluminium alloys, and metal substrates having coatings of aluminium or aluminium alloys, magnesium or metal substrates having specific coatings.

SUMMARY OF THE INVENTION

The problem addressed by the present invention is therefore that of providing a one-component heat-curing epoxy resin adhesive which improves the adhesion of the cured adhesive on specific metal substrates, especially metal substrates composed of steel having a zinc-magnesium coating, without any requirement for pretreatment of the metal substrate prior to the bonding. More particularly, a heat-resistant bond is to be achieved, meaning that the adhesion shall also be satisfactory under hot conditions, for example at a temperature of 80° C. An improved T-peel strength is also to be achieved. Moreover, the formation of bubbles is to be avoided as far as possible. Colour changes resulting from use of the carboxylic acid were likewise to be avoided as far as possible. The adhesives are also to have adequate storage stability.

It has been found that, surprisingly, this problem is solved particularly through the use of relatively small amounts of particular carboxylic acids in an epoxy resin adhesive. The invention therefore relates to the one-component heat-curing epoxy resin adhesive as defined in claim 1.

The addition of the carboxylic acid to the adhesive allows distinct improvement in the adhesion on specific metal substrates such as steel having a zinc-magnesium coating. More particularly, heat-resistant bonding is achieved. Thus, the bonding of the epoxy resin adhesive of the invention on steel having a ZM coating is still good even at 80° C.

The addition of acids to these systems is generally unusual, since it has been assumed that the properties of the adhesive are impaired by reaction of the acid with adhesive components, but this surprisingly did not occur. For example, it was possible to obtain bonds without any problems with regard to bubble formation.

Bubble formation may occur for different reasons, for example the decomposition or release of water as in the case of hydrates (e.g. citric acid). Another adverse effect is local brown discolouration. It is assumed that local exothermicity plays a role in this. The SikaPower-493 adhesive used in the experiments is blue in colour. The discolouration from blue to green observed in some cases is assumed to be caused by the exothermicity.

In further aspects, the invention relates to a method of bonding metal substrates or metal substrate-comprising articles with the one-component heat-curing epoxy resin adhesive of the invention, to an article comprising an adhesive bond which is obtainable by this method, and to the use of the epoxy resin adhesive of the invention for heat-resistant bonding of metal substrates.

Preferred executions of the invention are the subject of the dependent claims.

BRIEF DESCRIPTION OF THE DRAWING

FIG. 1 is an illustration of an arrangement that was used to determine the peel strength (dimensions in mm).

Ways of Executing the Invention

The present invention thus relates to a one-component heat-curing epoxy resin adhesive comprising
a) at least one epoxy resin having an average of more than one epoxy group per molecule;
b) at least one latent hardener for epoxy resins; and
c) at least one carboxylic acid selected from substituted or unsubstituted adipic acid, substituted or unsubstituted succinic acid, substituted or unsubstituted phthalic acid, substituted or unsubstituted terephthalic acid, substituted or unsubstituted isophthalic acid, substituted or unsubstituted benzenetricarboxylic acid and substituted or unsubstituted nitrobenzoic acid, excluding 2-hydroxysuccinic acid and 2,3-dihydroxysuccinic acid as carboxylic acid, wherein the epoxy resin adhesive contains 0.0015 to 0.04 mol of the at least one carboxylic acid per 100 g of the epoxy resin adhesive and the epoxy resin adhesive has a viscosity of 500-5000 Pas at 25° C., wherein the viscosity is determined by oscillographic means using a rheometer having a heatable plate (MCR 301, AntonPaar)(1000 µm gap, measurement plate diameter: 25 mm (plate/plate), deformation 0.01 at 5 Hz, temperature: 25° C.).

The epoxy resin adhesive is a one-component epoxy resin adhesive, meaning that the constituents of the epoxy resin adhesive, especially the epoxy resin and the hardener, are present in one pack without any occurrence of curing at standard ambient temperature or room temperature. Therefore, the one-component epoxy resin adhesive is storage-stable. It can therefore be handled in this form, whereas the mixing of the components is only possible immediately before application in the case of two-pack systems.

The curing of the one-component epoxy resin adhesive is effected by heating, typically at a temperature exceeding 70° C., for example in the range from 100 to 220° C. In this respect, it is a one-component heat-curing epoxy resin adhesive.

The prefix "poly" in expressions such as polyol or polyisocyanate means that the compound has two or more of the groups mentioned. A polyisocyanate is, for example, a compound having two or more isocyanate groups.

The expression "independently" as used hereinafter means that two or more substituents having the same designation in the same molecule may have the same or different meanings according to the definition.

The dotted lines in the formulae in this document each represent the bond between the particular substituent and the corresponding remainder of the molecule.

Room temperature is understood here to mean a temperature of 23° C., unless stated otherwise.

The heat-curing one-component epoxy resin adhesive contains at least one epoxy resin having an average of more than one epoxy group per molecule. The epoxy group preferably takes the form of a glycidyl ether group. The epoxy resin having an average of more than one epoxy group per molecule is preferably a liquid epoxy resin or a solid epoxy resin. The term "solid epoxy resin" is very familiar to the person skilled in the art of epoxies and is used by contrast to "liquid epoxy resins". The glass transition temperature of solid resins exceeds room temperature, meaning that they can be comminuted at room temperature to give pourable powders.

Preferred solid epoxy resins have the formula (X)

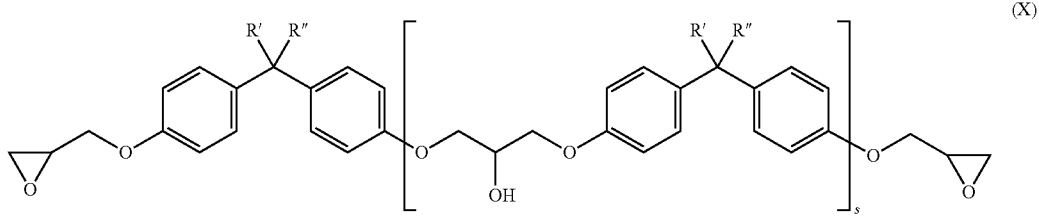

(X)

The substituents R' and R" here are each independently either H or CH$_3$.

In addition, the index s is a value of >1.5, especially of 1.5 to 12, preferably 2 to 12.

Solid epoxy resins of this kind are commercially available, for example from Dow or Huntsman or Momentive.

Compounds of the formula (X) having an index s in the range from greater than 1 to 1.5 are referred to by the person skilled in the art as semisolid epoxy resins. For this present invention, they are likewise considered to be solid resins. Preference is given, however, to solid epoxy resins in the narrower sense, i.e. solid epoxy resins of the formula (X) having an index s having a value of >1.5.

Preferred liquid epoxy resins have the formula (XI).

The substituents R''' and R'''' here are each independently either H or CH$_3$. In addition, the index r is a value from 0 to 1. Preferably, r is a value from 0 to less than 0.2.

The liquid resins are thus preferably diglycidyl ethers of bisphenol A (DGEBA), of bisphenol F and of bisphenol A/F (the expression 'A/F' refers here to a mixture of acetone with formaldehyde which is used as a reactant in the preparation thereof). Such liquid resins are available, for example, as Araldite® GY 250, Araldite® PY 304, Araldite® GY 282 (Huntsman) or D.E.R.™ 331 or D.E.R.™ 330 (Dow) or Epikote 828 (Momentive).

Preferably, the epoxy resin is a liquid epoxy resin of the formula (XI). In an even more preferred embodiment, the heat-curing epoxy resin adhesive comprises both at least one liquid epoxy resin of the formula (XI) and at least one solid epoxy resin of the formula (X).

The proportion of the epoxy resin having an average of more than one epoxy group per molecule is preferably 10% to 85% by weight, especially 15% to 70% by weight and more preferably 15% to 60% by weight, based on the total weight of the epoxy resin adhesive.

The heat-curing one-component epoxy resin adhesive further comprises at least one latent hardener for epoxy resins. Latent hardeners are essentially inert at room temperature and are activated by elevated temperature, typically at temperatures of 70° C. or more, which starts the curing reaction. It is possible to use the standard latent hardeners for epoxy resins. Preference is given to a latent nitrogen-containing hardener for epoxy resins.

Examples of suitable latent hardeners are dicyandiamide, guanamines, guanidines, aminoguanidines and derivatives thereof; substituted ureas, especially 3-(3-chloro-4-methylphenyl)-1,1-dimethylurea (chlortoluron), or phenyldimethylureas, especially p-chlorophenyl-N,N-dimethylurea (monuron), 3-phenyl-1,1-dimethylurea (fenuron) or 3,4-dichlorophenyl-N,N-dimethylurea (diuron), and imidazoles and amine complexes.

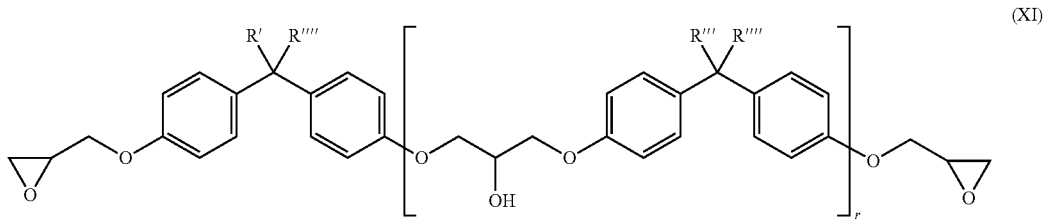

(XI)

A particularly preferred latent hardener is dicyandiamide.

The proportion of the latent hardener is preferably 0.5% to 12% by weight, more preferably 1% to 8% by weight, based on the total weight of the epoxy resin adhesive.

In addition, the heat-curing one-component epoxy resin adhesive comprises at least one carboxylic acid selected from substituted or unsubstituted adipic acid, substituted or unsubstituted succinic acid, substituted or unsubstituted phthalic acid, substituted or unsubstituted terephthalic acid, substituted or unsubstituted isophthalic acid, substituted or unsubstituted benzenetricarboxylic acid and substituted or unsubstituted nitrobenzoic acid. 2-Hydroxysuccinic acid and 2,3-dihydroxysuccinic acid are excluded as carboxylic acid.

The substituted or unsubstituted benzenetricarboxylic acid may be substituted or unsubstituted hemimellitic acid (1,2,3-benzenetricarboxylic acid), substituted or unsubstituted trimellitic acid (1,2,4-benzenetricarboxylic acid) or substituted or unsubstituted trimesic acid (1,3,5-benzenetricarboxylic acid), preference being given to substituted or unsubstituted trimellitic acid.

The substituted or unsubstituted nitrobenzoic acid may be substituted or unsubstituted 2-nitrobenzoic acid, substituted or unsubstituted 3-nitrobenzoic acid or substituted or unsubstituted trimeric acid 4-nitrobenzoic acid, wherein substituted or unsubstituted 2-nitrobenzoic acid is preferred.

The carboxylic acids mentioned may be unsubstituted or substituted, preference being given to the unsubstituted carboxylic acids and epoxidized carboxylic acids. The unsubstituted carboxylic acids are particularly preferred.

In the substituted carboxylic acids mentioned, one or more hydrogen atoms bonded to carbon atoms may be replaced by substituents, where the substituents may be the same or different when two or more substituents are present. The substituted carboxylic acids preferably have one or two substituents.

Examples of suitable substituents are alkyl, e.g. $C_1$-$C_6$-alkyl, cycloalkyl, e.g. $C_3$-$C_6$-cycloalkyl, aryl, e.g. phenyl, aralkyl, e.g. $C_1$-$C_3$-alkyl substituted by a phenyl group, arylalkyl, e.g. phenyl substituted by one or more $C_1$-$C_4$-alkyl groups, alkyloxy, e.g. $C_1$-$C_6$-alkoxy, aryloxy, e.g. phenoxy, aralkyloxy, hydroxyl, nitro, oxo (=O), mercapto, phenol and halogen.

A further example of a suitable substituent is an oxygen atom bonded to two adjacent carbon atoms to form an epoxide ring. Such epoxidized carboxylic acids are preferred as a substituted carboxylic acid. One example is 2,3-epoxysuccinic acid. Epoxysuccinic acid may be present in the form of cis-epoxysuccinic acid, trans-epoxysuccinic acid or a mixture of the two forms.

The at least one carboxylic acid is preferably selected from succinic acid, terephthalic acid, phthalic acid, isophthalic acid, trimellitic acid and nitrobenzoic acid. The at least one carboxylic acid is more preferably selected from succinic acid, phthalic acid, isophthalic acid and nitrobenzoic acid, most preferably from isophthalic acid and nitrobenzoic acid.

The at least one carboxylic acid used may be two or more of the carboxylic acids mentioned, but merely for practical reasons it is generally preferable that only one of the carboxylic acids mentioned is used as the at least one carboxylic acid.

The carboxylic acid used is preferably anhydrous carboxylic acid with no water of hydration.

The epoxy resin adhesive contains 0.0015 to 0.04 mol, preferably 0.002 to 0.03 mol, more preferably 0.003 to 0.02 mol and especially preferably 0.004 to 0.015 mol of the at least one carboxylic acid per 100 g of epoxy resin adhesive.

If water-containing epoxy resin adhesives are used, it is possible, albeit in a less preferred variant, to form the carboxylic acid in question in situ in the adhesive by using corresponding carboxylic anhydrides. However, the use of carboxylic anhydrides for in situ formation of the carboxylic acid in the one-component heat-curing epoxy resin adhesive is not preferred.

The one-component heat-curing epoxy resin adhesive may optionally comprise at least one terminally blocked polyurethane prepolymer. It is preferable that the epoxy resin adhesive comprises at least one terminally blocked polyurethane prepolymer. The terminally blocked polyurethane prepolymer is especially a polyurethane prepolymer having terminal isocyanate groups, the terminal isocyanate groups being blocked by a blocking group. These can be obtained by reacting a polyurethane prepolymer having terminal isocyanate groups with a standard blocking agent.

The at least one terminally blocked polyurethane prepolymer is preferably a terminally blocked polyurethane prepolymer of the formula (I).

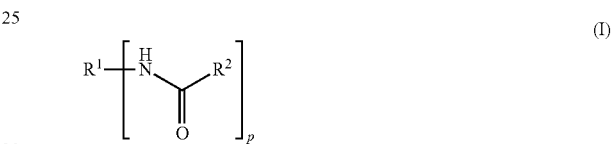

In this formula, $R^1$ is a p-valent radical of a linear or branched polyurethane prepolymer terminated by isocyanate groups after the removal of the terminal isocyanate groups and p is a value from 2 to 8.

In addition, $R^2$ is independently a substituent selected from the group consisting of

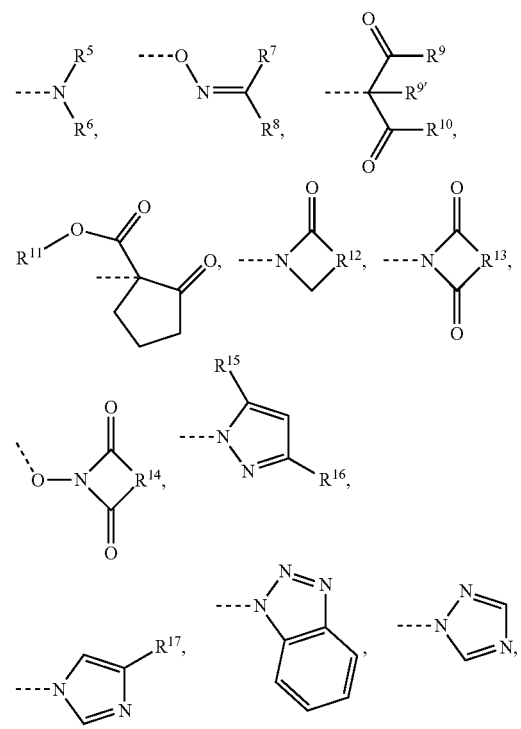

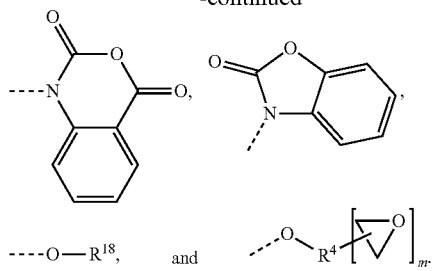

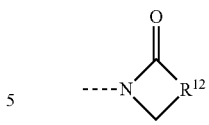

is ε-caprolactam after removal of the NH proton.

Preferred substituents of the formula —O—$R^{18}$ are monophenols or polyphenols, especially bisphenols, after removal of a phenolic hydrogen atom. Particularly preferred examples of such $R^2$ radicals are radicals selected from the group consisting of

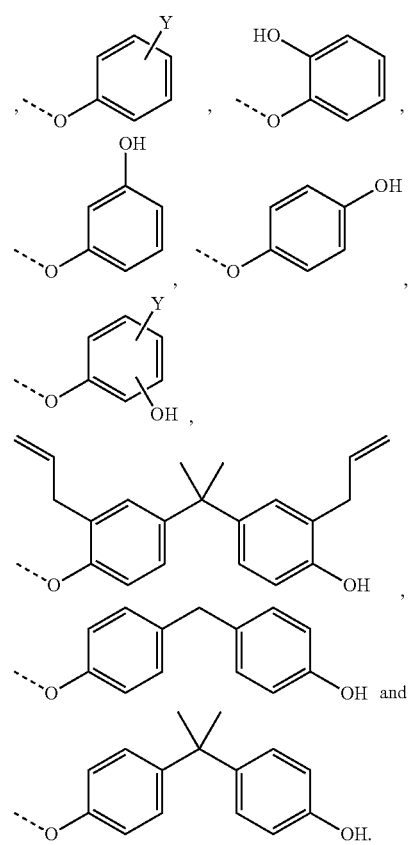

In these formulae, $R^5$, $R^6$, $R^7$ and $R^8$ are each independently an alkyl or cycloalkyl or aralkyl or arylalkyl group, or $R^5$ together with $R^6$, or $R^7$ together with $R^8$, forms part of a 4- to 7-membered ring which is optionally substituted.

In addition, $R^{9'}$ and $R^{10}$ are each independently an alkyl or aralkyl or arylalkyl group or an alkyloxy or aryloxy or aralkyloxy group and $R^{11}$ is an alkyl group.

$R^{12}$, $R^{13}$ and $R^{14}$ are each independently an alkylene group having 2 to 5 carbon atoms which optionally has double bonds or is substituted, or a phenylene group or a hydrogenated phenylene group.

$R^{15}$, $R^{16}$ and $R^{17}$ are each independently H or an alkyl group or an aryl group or an aralkyl group and $R^{18}$ is an aralkyl group or a mono- or polycyclic substituted or unsubstituted aromatic group optionally having aromatic hydroxyl groups.

Finally, $R^4$ is a radical of an aliphatic, cycloaliphatic, aromatic or araliphatic epoxide containing a primary or secondary hydroxyl group after the removal of the hydroxyl and epoxide groups and m is a value of 1, 2 or 3.

$R^{18}$ is especially considered firstly to be phenols or polyphenols, especially bisphenols, after removal of a hydroxyl group. Preferred examples of such phenols and bisphenols are especially phenol, cresol, resorcinol, catechol, cardanol (3-pentadecenylphenol (from cashew nut shell oil)), nonylphenol, phenols which have been reacted with styrene or dicyclopentadiene, bisphenol A, bisphenol F and 2,2'-diallyl bisphenol A. $R^{18}$ is considered secondly to be especially hydroxybenzyl alcohol and benzyl alcohol after removal of a hydroxyl group.

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, it is especially a linear or branched $C_1$-$C_{20}$-alkyl group.

If $R^5$, $R^6$, $R^7$, $R^8$, $R^9$, $R^{9'}$, $R^{10}$, $R^{15}$, $R^{16}$, $R^{17}$ or $R^{18}$ is an aralkyl group, this moiety is especially a methylene-bonded aromatic group, especially a benzyl group.

If $R^5$, $R^6$, $R^7$, $R^8$, $R^9$, $R^{9'}$ or $R^{10}$ is an alkylaryl group, it is especially a phenylene-bonded $C_1$- to $C_{20}$-alkyl group, for example tolyl or xylyl.

The $R^2$ radicals are preferably the substituents of the formulae

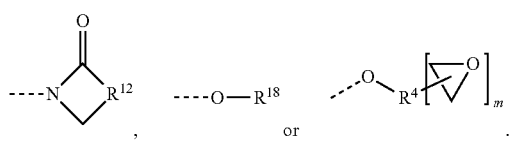

A preferred substituent of the formula

The Y radical here is a saturated, aromatic or olefinically unsaturated hydrocarbyl radical having 1 to 20 carbon atoms, especially having 1 to 15 carbon atoms. Preferred Y are especially allyl, methyl, nonyl, dodecyl, phenyl, alkyl ether, carboxylic ester or an unsaturated $C_{15}$-alkyl radical having 1 to 3 double bonds.

Most preferably, $R^2$ is

The terminally blocked polyurethane prepolymer of the formula (I) is prepared from the linear or branched polyurethane prepolymer terminated by isocyanate groups with one or more isocyanate-reactive compounds $R^2H$. If two or more isocyanate-reactive compounds of this kind are used, the reaction can be effected sequentially or with a mixture of these compounds.

The reaction is preferably effected in such a way that the one or more isocyanate-reactive compounds $R^2H$ are used stoichiometrically or in a stoichiometric excess, in order to ensure that all NCO groups have been converted.

The polyurethane prepolymer having isocyanate end groups on which $R^1$ is based can be prepared from at least one isocyanate or triisocyanate and from a polymer $Q_{PM}$ having terminal amino, thiol or hydroxyl groups and/or from an optionally substituted polyphenol $Q_{PP}$.

Suitable diisocyanates are aliphatic, cycloaliphatic, aromatic or araliphatic diisocyanates, especially commercial products such as methylenediphenyl diisocyanate (MDI), hexamethylene diisocyanate (HDI), toluene diisocyanate (TDI), toluidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, naphthalene 1,5-diisocyanate (NDI), dicyclohexylmethyl diisocyanate ($H_{12}$MDI), p-phenylene diisocyanate (PPDI), m-tetramethylxylylene diisocyanate (TMXDI), etc. and dimers thereof. Preference is given to HDI, IPDI, MDI or TDI.

Suitable triisocyanates are trimers or biurets of aliphatic, cycloaliphatic, aromatic or araliphatic diisocyanates, especially the isocyanurates and biurets of the diisocyanates described in the preceding paragraph. It is of course also possible to use suitable mixtures of di- or triisocyanates.

Especially suitable polymers $Q_{PM}$ having terminal amino, thiol or hydroxyl groups are polymers $Q_{PM}$ having two or three terminal amino, thiol or hydroxyl groups.

The polymers $Q_{PM}$ advantageously have an equivalent weight of 300-6000, especially of 600-4000 and preferably of 700-2200 g/equivalent of NCO-reactive groups.

Suitable polymers $Q_{PM}$ are polyols, for example the following commercially available polyols or any desired mixtures thereof:

polyoxyalkylenepolyols, also called polyetherpolyols, which are the polymerization product of ethylene oxide, 1,2-propylene oxide, 1,2- or 2,3-butylene oxide, tetrahydrofuran or mixtures thereof, optionally polymerized with the aid of a starter molecule having two or three active hydrogen atoms, for example water or compounds having two or three OH groups. It is possible to use either polyoxyalkylenepolyols having a low degree of unsaturation (measured to ASTM D-2849-69 and reported in milliequivalents of unsaturation per gram of polyol (meq/g)), prepared, for example, with the aid of double metal cyanide complex catalysts (DMC catalysts for short), or polyoxyalkylenepolyols having a higher degree of unsaturation, prepared, for example, with the aid of anionic catalysts such as NaOH, KOH or alkali metal alkoxides. Particularly suitable are polyoxypropylenediols and -triols having a degree of unsaturation lower than 0.02 meq/g and having a molecular weight in the range of 1000-30,000 daltons, polyoxybutylenediols and -triols, polyoxypropylenediols and -triols having a molecular weight of 400-8,000 daltons, and "EO-endcapped" (ethylene oxide-endcapped) polyoxypropylene-diols or -triols. The latter are specific polyoxypropylenepolyoxyethylenepolyols which are obtained, for example, by alkoxylating pure polyoxypropylenepolyols with ethylene oxide on completion of the polypropoxylation, as a result of which they have primary hydroxyl groups.

Hydroxy-terminated polybutadienepolyols, for example those which are prepared by polymerization of 1,3-butadiene and allyl alcohol or by oxidation of polybutadiene, and the hydrogenation products thereof;

styrene-acrylonitrile-grafted polyetherpolyols, as supplied, for example, by BASF under the Lupranol® name;

poly-hydroxy-terminated acrylonitrile/butadiene copolymers, as preparable, for example, from carboxyl-terminated acrylonitrile/butadiene copolymers (commercially available under the Hypox® CTBN name from Emerald Perfomance Materials) and epoxides or amino alcohols;

polyesterpolyols, prepared, for example, from di- to trihydric alcohols, for example ethane-1,2-diol, diethylene glycol, propane-1,2-diol, dipropylene glycol, butane-1,4-diol, pentane-1,5-diol, hexane-1,6-diol, neopentyl glycol, glycerol, 1,1,1-trimethylolpropane or mixtures of the aforementioned alcohols with organic dicarboxylic acids or anhydrides or esters thereof, for example succinic acid, glutaric acid, adipic acid, suberic acid, sebacic acid, dodecane-dicarboxylic acid, maleic acid, fumaric acid, phthalic acid, isophthalic acid, terephthalic acid and hexahydrophthalic acid or mixtures of the aforementioned acids, and polyesterpolyols formed from lactones, for example ε-caprolactone;

polycarbonatepolyols as obtainable by reaction, for example, of the abovementioned alcohols—used to form the polyesterpolyols—with dialkyl carbonates, diaryl carbonates or phosgene.

Advantageous polymers $Q_{PM}$ are those of difunctional or higher-functionality polyols having OH equivalent weights of 300 to 6000 g/OH equivalent, especially of 600 to 4000 g/OH equivalent, preferably 700-2200 g/OH equivalent. Further advantageously, the polyols are selected from the group consisting of polyethylene glycols, polypropylene glycols, polyethylene glycol-polypropylene glycol block copolymers, polybutylene glycols, hydroxyl-terminated polybutadienes, hydroxyl-terminated butadiene/acrylonitrile copolymers, hydroxyl-terminated synthetic rubbers, hydrogenation products thereof and mixtures of said polyols.

In addition, polymers $Q_{PM}$ used may also be difunctional or higher-functionality amino-terminated polyethylene ethers, polypropylene ethers, as sold, for example, under the Jeffamine® name by Huntsman, polybutylene ethers, polybutadienes, butadiene/acrylonitrile copolymers, as sold, for example, under the Hypro® ATBN name by Emerald Performance Materials, and further amino-terminated synthetic rubbers or mixtures of the components mentioned.

For certain applications, suitable polymers $Q_{PM}$ are especially polybutadienes or polyisoprenes having hydroxyl groups, or the partially or fully hydrogenated reaction products thereof.

It is additionally possible that the polymers $Q_{PM}$ may also have been chain-extended, as can be conducted in the manner known to the person skilled in the art by the reaction of polyamines, polyols and polyisocyanates, especially of diamines, diols and diisocyanates.

Using the example of a diisocyanate and a diol, what is formed therefrom, as shown hereinafter, according to the stoichiometry chosen, is a species of the formula (VI) or (VII)

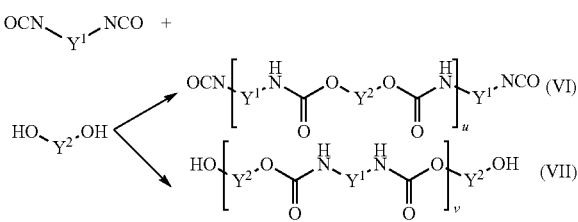

The $Y^1$ and $Y^2$ radicals are a divalent organic radical and the indices u and v vary according to the stoichiometric ratio from 1 to typically 5.

These species of the formula (VI) or (VII) can then in turn be reacted further. For example, the species of the formula (VI) and a diol having a divalent organic radical $Y^3$ can form a chain-extended polyurethane prepolymer of the following formula:

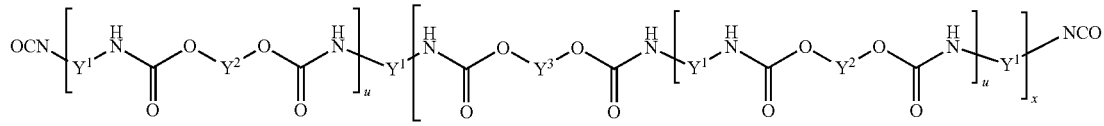

The species of the formula (VII) and a diisocyanate having a divalent organic $Y^4$ radical can form a chain-extended polyurethane prepolymer of the following formula:

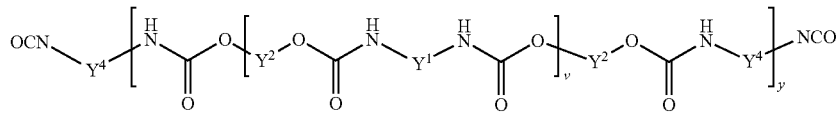

The indices x and y vary according to the stoichiometric ratio from 1 to typically 5, and are especially 1 or 2.

In addition, the species of the formula (VI) can also be reacted with the species of the formula (VII), so as to form a chain-extended polyurethane prepolymer having NCO groups.

For the chain extension, preference is given especially to diols and/or diamines and diisocyanates. It will of course be clear to the person skilled in the art that it is also possible to use higher-functionality polyols, for example trimethylolpropane or pentaerythritol, or higher-functionality polyisocyanates, such as isocyanurates of diisocyanates, for the chain extension.

In the polyurethane prepolymers in general and in the chain-extended polyurethane prepolymers in particular, it should advantageously be ensured that the prepolymers do not have excessively high viscosities, especially when higher-functionality compounds are being used for the chain extension, since this can make it more difficult to convert them to the polyurethane prepolymers of the formula (I) and/or to apply the adhesive.

Preferred polymers $Q_{PM}$ are polyols having molecular weights between 600 and 6000 daltons, selected from the group consisting of polyethylene glycols, polypropylene glycols, polyethylene glycol-polypropylene glycol block polymers, polybutylene glycols, hydroxyl-terminated polybutadienes, hydroxyl-terminated butadiene-acrylonitrile copolymers and mixtures thereof.

Especially preferred polymers $Q_{PM}$ are α,ω-dihydroxypolyalkylene glycols having $C_2$-$C_6$-alkylene groups or having mixed $C_2$-$C_6$-alkylene groups, terminated by amino groups, thiol groups or, preferably, hydroxyl groups. Particular preference is given to polypropylene glycols or polybutylene glycols. In addition, particular preference is given to polyoxybutylenes terminated by hydroxyl groups.

Especially suitable polyphenols $Q_{PP}$ are bis-, tris- and tetraphenols. This is understood to mean not just straight phenols but optionally also substituted phenols. The nature of the substitution may be very varied. More particularly, this is understood to mean substitution directly on the aromatic ring to which the phenolic OH group is bonded. Phenols are additionally understood to mean not just monocyclic aromatics but also polycyclic or fused aromatics or heteroaromatics having the phenolic OH group directly on the aromatic or heteroaromatic system.

The nature and position of such a substituent affects, inter alia, the reaction with isocyanates needed for the formation of a polyurethane prepolymer.

The bis- and trisphenols are particularly suitable. Examples of suitable bisphenols or trisphenols are 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl) sulphone (=bisphenol S), naphtho-resorcinol, dihydroxynaphthalene, dihydroxyanthraquinone, dihydroxybiphenyl, 3,3-bis(p-hydroxyphenyl)phthalide, 5,5-bis(4-hydroxyphenyl)hexahydro-4,7-methanoindane, phenolphthalein, fluorescein, 4,4-[bis(hydroxyphenyl)-1,3-phenylenebis-(1-methylethylidene)] (=bisphenol M), 4,4'-[bis(hydroxyphenyl)-1,4-phenylenebis(1-methylethylidene)] (=bisphenol P), 2,2'-diallyl bisphenol A, diphenols and dicresols prepared by reaction of phenols or cresols with diisopropylidenebenzene, phloroglucinol, gallic esters, phenol or cresol novolaks having —OH functionality of 2.0 to 3.5 and all isomers of the aforementioned compounds.

Preferred diphenols and dicresols prepared by reaction of phenols or cresols with diisopropylidenebenzene have a chemical structural formula as shown correspondingly hereinafter for cresol as an example:

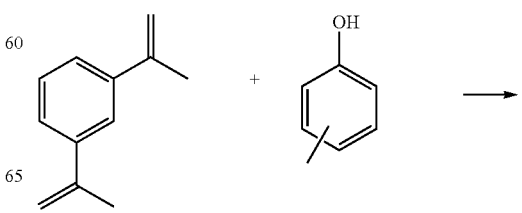

-continued

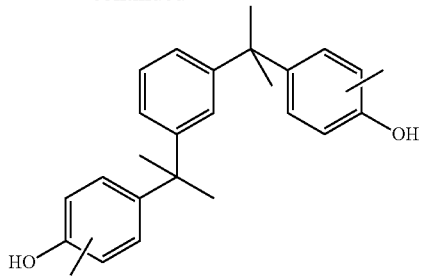

Particular preference is given to nonvolatile bisphenols. Most preferred are bisphenol M, bisphenol S and 2,2'-diallyl bisphenol A.

Preferably, the $Q_{PP}$ has 2 or 3 phenolic groups.

In a first embodiment, the polyurethane prepolymer is prepared from at least one diisocyanate or triisocyanate and from a polymer $Q_{PM}$ having terminal amino, thiol or hydroxyl groups. The polyurethane prepolymer is prepared in a manner known to the person skilled in the art of polyurethanes, especially by using the diisocyanate or triisocyanate in a stoichiometric excess in relation to the amino, thiol or hydroxyl groups of the polymer $Q_{PM}$.

In a second embodiment, the polyurethane prepolymer is prepared from at least one diisocyanate or triisocyanate and from an optionally substituted polyphenol $Q_{PP}$. The polyurethane prepolymer is prepared in a manner known to the person skilled in the art of polyurethanes, especially by using the diisocyanate or triisocyanate in a stoichiometric excess in relation to the phenolic groups of the polyphenol $Q_{PP}$.

In a third embodiment, the polyurethane prepolymer is prepared from at least one diisocyanate or triisocyanate and from a polymer $Q_{PM}$ having terminal amino, thiol or hydroxyl groups, and from an optionally substituted polyphenol $Q_{PP}$. For preparation of the polyurethane prepolymer from at least one diisocyanate or triisocyanate and from a polymer $Q_{PM}$ having terminal amino, thiol or hydroxyl groups and/or from an optionally substituted polyphenol $Q_{PP}$, various options are available.

The polyurethane prepolymer having isocyanate end groups preferably has elastic character. It preferably has a glass transition temperature Tg of less than 0° C.

A particularly preferred isocyanate-reactive compound $R^2H$ is considered to be the monohydroxyl epoxide compound of the formula (V).

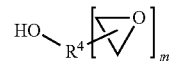

(v)

If a plurality of such monohydroxyl epoxide compounds are used, the reaction can be effected sequentially or with a mixture of these compounds.

The monohydroxyl epoxide compound of the formula (V) has 1, 2 or 3 epoxy groups. The hydroxyl group of this monohydroxyl epoxide compound (V) may be a primary or secondary hydroxyl group.

Such monohydroxyl epoxide compounds can be produced, for example, by reaction of polyols with epichlorohydrin. According to the reaction regime, the reaction of polyfunctional alcohols with epichlorohydrin also gives rise to the corresponding monohydroxyl epoxide compounds in different concentrations as by-products. These can be isolated by customary separating operations. In general, however, it is sufficient to use the product mixture obtained in the glycidylization reaction of polyols, composed of polyol reacted completely and partially to give the glycidyl ether. Examples of such hydroxyl-containing epoxides are butanediol monoglycidyl ether (present in butanediol diglycidyl ether), hexanediol monoglycidyl ether (present in hexanediol diglycidyl ether), cyclohexanedimethanol glycidyl ether, trimethylolpropane diglycidyl ether (present as a mixture in trimethylolpropane triglycidyl ether), glycerol diglycidyl ether (present as a mixture in glycerol triglycidyl ether), pentaerythritol triglycidyl ether (present as a mixture in pentaerythritol tetraglycidyl ether). Preference is given to using trimethylolpropane diglycidyl ether, which is present in a relatively high proportion in trimethylolpropane triglycidyl ether prepared in a standard manner.

But it is also possible to use similar hydroxyl-containing epoxides, especially glycidol, 3-glycidyloxybenzyl alcohol or hydroxymethylcyclohexene oxide. Preference is further given to the β-hydroxy ether of the formula (IX) which is present in an amount of about 15% in commercial liquid epoxy resins prepared from bisphenol A (R=CH₃) and epichlorohydrin, and the corresponding β-hydroxy ethers of the formula (IX) which are formed in the reaction of bisphenol F (R=H) or the mixture of bisphenol A and bisphenol F with epichlorohydrin.

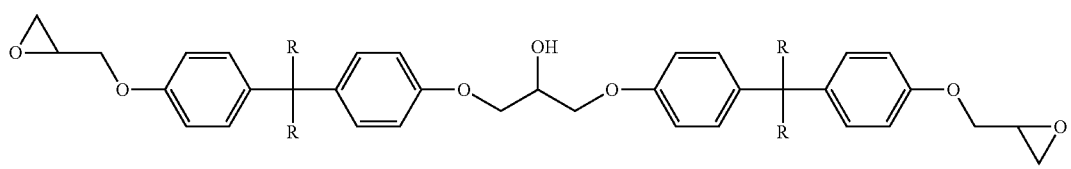

(IX)

Preference is further also given to distillation residues obtained in the preparation of high-purity distilled liquid epoxy resins. Such distillation residues have a concentration of hydroxyl-containing epoxides up to three times higher than commercial undistilled liquid epoxy resins. Furthermore, it is also possible to use a wide variety of different epoxides having a β-hydroxy ether group, prepared by the reaction of (poly)epoxides with a deficiency of monovalent nucleophiles such as carboxylic acids, phenols, thiols or sec-amines.

The R⁴ radical is preferably a trivalent radical of the formula

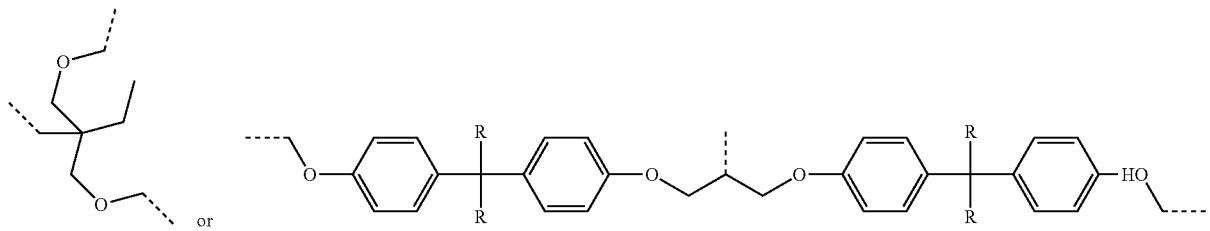

or where R is methyl or H.

The free primary or secondary OH functionality of the monohydroxyl epoxide compound of the formula (V) permits an efficient reaction with terminal isocyanate groups of prepolymers without having to use disproportionate excesses of the epoxy component for the purpose.

If used, the amount of the terminally blocked polyurethane prepolymer, especially of the terminally blocked polyurethane prepolymer of the formula (I), may, for example, be 1% to 45% by weight, preferably 3% to 35% by weight, based on the total weight of the one-component heat-curing epoxy resin adhesive.

In addition, the one-component heat-curing epoxy resin adhesive may optionally comprise at least one filler, which constitutes a preferred embodiment. Preferred examples of suitable fillers are mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminium hydroxide, magnesium oxide, hollow ceramic beads, graphite or colour pigments. The filler may, for example, have an organic coating or be uncoated. Such fillers are commercially available.

It is possible to use one or more fillers. If used, the proportion of the at least one filler is, for example, 3% to 50% by weight, preferably 5% to 35% by weight, more preferably 5% to 25% by weight, based on the total weight of the one-component heat-curing epoxy resin adhesive.

The heat-curing epoxy resin adhesive may further optionally comprise a thixotropic agent based on a urea derivative. The urea derivative is especially a reaction product of an aromatic monomeric diisocyanate with an aliphatic amine compound. It is also possible to react two or more different monomeric diisocyanates with one or more aliphatic amine compounds or a monomeric diisocyanate with two or more aliphatic amine compounds. A particularly advantageous reaction product has been found to be that of diphenylmethylene 4,4'-diisocyanate (MDI) with butylamine.

The urea derivative, if used, is preferably present in a carrier material. The carrier material may be a plasticizer, preferably a phthalate or an adipate, for example diisodecyl phthalate (DIDP) or dioctyl adipate (DOA). The carrier medium may also be a non-diffusing carrier medium. This is preferable in order to assure minimum migration after curing of unreacted constituents. Preference is given to blocked polyurethane prepolymers as non-diffusing carrier media.

The preparation of such preferred urea derivatives and carrier materials is described in detail in patent application EP 1 152 019 A1. The carrier material is advantageously a blocked polyurethane prepolymer, especially obtained by reaction of a trifunctional polyetherpolyol with IPDI and subsequent blocking of the terminal isocyanate groups with ε-caprolactam.

The proportion of the thixotropic agent is, for example, 0% to 40% by weight, preferably 5% to 25% by weight, based on the total weight of the one-component heat-curing epoxy resin adhesive. The weight ratio of urea derivative to carrier medium, if present, is, for example, in the range from 2/98 to 50/50, preferably 5/95-25/75.

The one-component heat-curing epoxy resin adhesive optionally and preferably further comprises a liquid rubber. This may be, for example, a carboxyl- or epoxy-terminated polymer.

In a first embodiment, this liquid rubber may be a carboxyl- or epoxy-terminated acrylonitrile/butadiene copolymer or a derivative thereof. Liquid rubbers of this kind are commercially available, for example, under the Hypro/Hypox® CTBN and CTBNX and ETBN names from Emerald Performance Materials. Suitable derivatives are especially elastomer-modified prepolymers having epoxy groups, as sold commercially in the Polydis® product line, especially in the Polydis® 36 . . . product line, by Struktol® (Schill+Seilacher Gruppe, Germany) or in the Albipox product line (Evonik, Germany).

In a second embodiment, this liquid rubber may be a polyacrylate liquid rubber which is fully miscible with liquid epoxy resins and only separates to give microdroplets in the course of curing of the epoxy resin matrix. Liquid polyacrylate rubbers of this kind are available, for example, under the 20208-XPA name from Dow.

It is of course also possible to use mixtures of liquid rubbers, especially mixtures of carboxyl- or epoxy-terminated acrylonitrile/butadiene copolymers or of derivatives thereof.

The liquid rubber, if used, is used, for example, in an amount of 1% to 35% by weight, especially 1% to 25% by weight, based on the weight of the one-component heat-curing epoxy resin adhesive.

The one-component heat-curing epoxy resin adhesive optionally further comprises a toughness improver, especially a solid toughness improver. The use of a toughness improver is preferred. Toughness improvers serve to improve the toughness of the cured epoxy resin adhesive and are known to the person skilled in the art in the field. The addition of a toughness improver, especially a solid toughness improver, to the epoxy resin adhesive, even in the case of small additions of, for example, 0.1% to 15% by weight, especially 0.5% to 8% by weight, based on the weight of the one-component heat-curing epoxy resin adhesive, can bring about a distinct increase in toughness. As a result, the cured adhesive can absorb higher flexural, tensile, impact or shock stress before the matrix cracks or fractures.

One example of a solid toughness improver is an organic ion-exchanged layered mineral. The organic ion-exchanged layered mineral may be a cation-exchanged layered mineral or an anion-exchanged layered mineral. It is also possible that the adhesive contains a cation-exchanged layered mineral and an anion-exchanged layered mineral.

The cation-exchanged layered mineral can be obtained, for example, from a layered mineral in which at least some of the cations have been exchanged for organic cations. Examples of such cation-exchanged layered minerals are those mentioned in U.S. Pat. No. 5,707,439 or in U.S. Pat. No. 6,197,849. Likewise described therein is the process for producing these cation-exchanged layered minerals. A preferred layered mineral is a sheet silicate. Preferably, the layered mineral is a phyllosilicate as described in U.S. Pat. No. 6,197,849 column 2 line 38 to column 3 line 5, especially a bentonite. Particularly suitable layered minerals have been found to be those such as kaolinite or a montmorillionite or a hectorite or an illite.

At least some of the cations of the layered mineral are replaced by organic cations. Examples of such cations are n-octylammonium, trimethyldodecylammonium, dimethyldodecylammonium or bis(hydroxyethyl)-octadecylammonium or similar derivatives of amines which can be obtained from natural fats and oils; or guanidinium cations or amidinium cations; or cations of the N-substituted derivatives of pyrrolidine, piperidine, piperazine, morpholine, thiomorpholine; or cations of 1,4-diazobicyclo[2.2.2]octane (DABCO) and 1-azobicyclo[2.2.2]octane; or cations of N-substituted derivatives of pyridine, pyrrole, imidazole, oxazole, pyrimidine, quinoline, isoquinoline, pyrazine, indole, benzimidazole, benzoxazole, thiazole, phenazine and 2,2'-bipyridine. Additionally suitable are cyclic amidinium cations, especially those as disclosed in U.S. Pat. No. 6,197,849 in column 3 line 6 to column 4 line 67. Cyclic ammonium compounds feature elevated thermal stability compared to linear ammonium compounds, since thermal Hoffmann degradation cannot occur therein.

Preferred cation-exchanged layered minerals are known to the person skilled in the art by the term organoclay or nanoclay and are commercially available, for example, under the Tixogel®, Cloisite® (Altana) or Nanomer® (Nanocor Inc.) group names.

An anion-exchanged layered mineral is obtained, for example, from a layered mineral in which at least some of the anions have been exchanged for organic anions. One example of such an anion-exchanged layered mineral is a hydrotalcite in which at least some of the carbonate anions in the intermediate layers have been exchanged for organic anions. A further example is functionalized alum inoxanes, as described in U.S. Pat. No. 6,322,890.

In a second embodiment, the solid toughness improver may be a block copolymer. The block copolymer is obtained from an anionic or controlled free-radical polymerization of methacrylic esters with at least one further monomer having an olefinic double bond. Preferred monomers having an olefinic double bond are those in which the double bond is directly conjugated to a heteroatom or to at least one further double bond. Especially suitable monomers are those selected from the group comprising styrene, butadiene, acrylonitrile and vinyl acetate. Preference is given to acrylate-styrene-acrylic acid (ASA) copolymers, available, for example, under the GELOY 1020 name from Sabic.

Particularly preferred block copolymers are block copolymers of methyl methacrylate, styrene and butadiene. Block copolymers of this kind are available, for example, as triblock copolymers under the SBM group designation at Arkema.

In a third embodiment, the solid toughness improver may be a core-shell polymer. Core-shell polymers consist of an elastic core polymer and a rigid shell polymer. Particularly suitable core-shell polymers consist of a core of elastic acrylate or butadiene polymer surrounded by a rigid shell of a rigid thermoplastic polymer. This core-shell structure forms either spontaneously through separation of a block copolymer or is defined by the polymerization regime as a latex or suspension polymerization with subsequent grafting. Preferred core-shell polymers are those called MBS polymers which are commercially available under the Clearstrength™ trade name from Arkema, Paraloid™ from Dow or F-351™ from Zeon.

Particular preference is given to core-shell polymer particles that are already in the form of a dried polymer latex. Examples of these are GENIOPERL M23A from Wacker having a polysiloxane core and acrylate shell, radiation-crosslinked rubber particles of the NEP series manufactured by Omnova or Nanoprene from Lanxess or Paraloid EXL from Dow.

Further comparable examples of core-shell polymers are supplied under the Albidur™ name by Evonik, Germany.

In a fourth embodiment, the solid toughness improver may be a solid reaction product of a carboxylated solid nitrile rubber with excess epoxy resin.

Preferred solid toughness improvers are core-shell polymers. The heat-curing epoxy resin adhesive may contain the solid core-shell polymer, if used, for example, in an amount of 0.1% to 15% by weight, preferably 1% to 8% by weight, based on the weight of the one-component heat-curing epoxy resin adhesive.

In one embodiment, the one-component heat-curing epoxy resin adhesive may optionally contain a physical or chemical blowing agent. Such blowing agents are available, for example, as Expancel™ from Akzo Nobel or Celogen™ from Chemtura. The proportion of the blowing agent, if used, is, for example, 0.1% to 3% by weight, based on the weight of the one-component heat-curing epoxy resin adhesive.

In a preferred embodiment, the one-component heat-curing epoxy resin adhesive optionally additionally comprises at least one reactive diluent bearing epoxy groups. Such reactive diluents are known to the person skilled in the art. Preferred examples of reactive diluents bearing epoxy groups are:

glycidyl ethers of monofunctional saturated or unsaturated, branched or unbranched, cyclic or open-chain $C_4$-$C_{30}$ alcohols, for example butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether etc.

glycidyl ethers of difunctional saturated or unsaturated, branched or unbranched, cyclic or open-chain $C_2$-$C_{30}$ alcohols, for example ethylene glycol glycidyl ether, butanediol glycidyl ether, hexanediol glycidyl ether, octanediol glycidyl ether, cyclohexanedimethanol diglycidyl ether, neopentyl glycol diglycidyl ether etc.

glycidyl ethers of tri- or polyfunctional, saturated or unsaturated, branched or unbranched, cyclic or open-chain alcohols such as epoxidized castor oil, epoxidized trimethylolpropane, epoxidized pentaerythritol or polyglycidyl ethers of aliphatic polyols such as sorbitol, glycerol, trimethylolpropane etc.

glycidyl ethers of phenol compounds and aniline compounds such as phenyl glycidyl ether, cresyl glycidyl ether, p-tert-butylphenyl glycidyl ether, nonylphenol glycidyl ether, 3-n-pentadecenyl glycidyl ether (from cashew nut shell oil), N,N-diglycidylaniline etc.

epoxidized amines such as N,N-diglycidylcyclohexylamine etc.

epoxidized mono- or dicarboxylic acids such as glycidyl neodecanoate, glycidyl methacrylate, glycidyl benzoate, diglycidyl phthalate, diglycidyl tetrahydrophthalate and diglycidyl hexahydrophthalate, diglycidyl esters of dimeric fatty acids etc.

epoxidized di- or trifunctional, low to high molecular weight polyetherpolyols such as polyethylene glycol diglycidyl ether, polypropylene glycol diglycidyl ether etc.

Particular preference is given to hexanediol diglycidyl ether, cresyl glycidyl ether, p-tert-butylphenyl glycidyl ether, polypropylene glycol diglycidyl ether and polyethylene glycol diglycidyl ether.

The total proportion of the reactive diluent bearing epoxy groups, if used, is, for example, 0.5% to 20% by weight, preferably 1% to 8% by weight, based on the weight of the one-component heat-curing epoxy resin adhesive.

The one-component heat-curing epoxy resin adhesive may comprise one or more further constituents customary in this field, for example catalysts, heat and/or light stabilizers, thixotropic agents, plasticizers, solvents, mineral or organic fillers, dyes, adhesion promoters and pigments.

The adhesive may optionally also contain spacers. Spacers can keep two bodies at a spatial distance. The spacer may be hollow. The spacers are especially particles which may or may not be hollow. The spacers advantageously have a particle size of less than 1 mm. The spacer advantageously has a very narrow size distribution, especially a monomodal size distribution.

The spacers may have any desired shape, preferred spacers being beads and cubes. Examples of hollow spacers are hollow glass beads, hollow ceramic beads or hollow steel beads.

The spacers may have been manufactured from different materials. The spacer preferably has a hardness on the Mohs hardness scale of greater than 5, preferably greater than 6, especially greater than 7. The spacer is preferably made from glass, ceramic, metal, for example ferrous metals, nonferrous metals or white metals, metal alloy, aluminium oxide, silicon dioxide, zirconium oxide, nitride, especially boron nitride, or carbide, especially silicon carbide. Most preferably, the spacer is made from glass, steel or ceramic.

The proportion of the spacer, if used, is chosen, for example, in such a way that the proportion by volume of the spacer is not more than 10% by volume, especially 0.1% to 5% by volume, preferably 0.5% to 4% by volume, based on the one-component heat-curing epoxy resin adhesive.

The spacers may be introduced into the one-component heat-curing epoxy resin adhesive in the course of production thereof or they may be mixed into, blown into, scattered into or scattered onto the adhesive during or immediately after the application of the adhesive. Any such spacers present are considered to be part of the adhesive.

The one-component heat-curing epoxy resin adhesive has a viscosity of 500-5000 Pas at 25° C., especially 500-4000 Pas at 25° C. The viscosity at 25° C. more preferably has a value between 1000 Pas and 4000 Pas. Most preferably, the viscosity at 25° C. is between 1000 Pas and 3000 Pas, especially between 1100 and 2800 Pas.

The viscosity is measured here by oscillographic means using a rheometer having a heatable plate (MCR 301, AntonPaar) (gap 1000 μm, measurement plate diameter: 25 mm (plate/plate), deformation 0.01 at 5 Hz, temperature: 25° C.). At 60° C., the adhesive advantageously has a viscosity (measured correspondingly at 60° C.) between 600 and 50 Pas. At 50° C., the adhesive advantageously has a viscosity (measured correspondingly at 50° C.) between 800 and 150 Pas.

The epoxy resin adhesive of the invention can be used not just as an adhesive but, if appropriate, also as a sealant or coating composition.

A further aspect of the present invention relates to a method of bonding substrates, especially metal substrates, comprising the steps of a) applying a one-component heat-curing epoxy resin adhesive of the invention as defined above to a first substrate, especially a metal substrate;

b) contacting the epoxy resin adhesive applied with a second substrate, especially a metal substrate, to form an adhesive bond; and c) curing the epoxy resin adhesive in the adhesive bond at a temperature in the range from 100 to 220° C.

The first and/or second substrate, especially metal substrate, may each be used as such or as part of an article, i.e. of an article comprising the first or second substrate, especially metal substrate. Preferably, the substrates, especially metal substrates, are used as such. The first and second substrates, especially metal substrates, may be made from the same or different materials.

The first and/or second substrates are preferably metal substrates. If appropriate, however, heat-resistant plastics, for example polyamides (PA), polyphenylene ethers, e.g. Noryl®, or carbon fibre-reinforced plastics (CFP), are also conceivable as first and/or second substrate.

Suitable first and/or second metal substrates are in principle all the metal substrates known to the person skilled in the art, especially in the form of a sheet, as utilized, for example, in the construction of modes of transport, for example in the automobile industry, or in the production of white goods.

Examples of the first and/or second metal substrate are metal substrates, especially sheets, of steel, especially electrolytically galvanized steel, hot-dip galvanized steel or oiled steel, bonazinc-coated steel, and subsequently phosphated steel, and also aluminium, especially in the variants that typically occur in automaking, and also magnesium or magnesium alloys.

However, the first and/or second metal substrate are more preferably a metal substrate, especially a sheet, selected from steel having a zinc-magnesium coating, hot-dip galvanized steel having a coating comprising zinc sulphate and/or zinc hydroxysulphate, cold-rolled steel, aluminium, aluminium alloy, or a metal, especially steel, having a coating of aluminium or an aluminium alloy, metal substrates, especially steel substrates, having a forming aid as coating, and magnesium or magnesium alloys. Even more preferred is a metal substrate, especially a sheet, selected from steel having a zinc-magnesium coating, hot-dip galvanized steel having a coating comprising zinc sulphate and/or zinc hydroxysulphate, or non-galvanized cold-rolled steel. Most preferably, the first and/or second metal substrate is a metal substrate, especially a sheet, of steel having a zinc-magnesium coating.

Steel having a zinc-magnesium coating (ZM coating) is known to those skilled in the art and is supplied by various manufacturers. The ZM coating on the steel is obtained by a bath galvanization as in the standard hot-dip galvanization, except that the bath, in addition to zinc, also contains magnesium and optionally aluminium. Steel having a ZM coating which also contains aluminium is sometimes also referred to as steel having a zinc-aluminium-magnesium (ZAM) coating. Steel having a ZM coating here also includes steel having a ZAM coating.

Hot-dip galvanized steel having a coating comprising zinc sulphate and/or zinc hydroxysulphate is commercially available. These steels are especially those obtained by the NIT method (NIT=New Inorganic Treatment) which has been developed by ArcelorMittal. This involves treating hot-dip galvanized steel with a solution containing sulphate and optionally zinc, as a result of which zinc sulphate and/or zinc hydroxysulphate are deposited on the hot-dip galvanized surface. Details of this method and the coatings obtained are described, for example, in EP-A1-2450470, to which reference is hereby made.

The above-described coating, also referred to as NIT is a specific coating for improving the tribological properties in the course of forming. Such coatings are also called forming aids. Other forming aids are known. Examples of forming aids on metal substrates, especially steel substrates, are, for example, prelube oils, drylubes or phosphations. Substrates having additional forming aids are supplied by various steel manufacturers. ThyssenKrupp Steel offers such substrates, for example, under the Bonderite® name. Salzgitter together with Fuchs Petrolube has developed a forming aid which is being marketed as Trenoil Advanced Tribo Primer (ATP).

The cold-rolled steel is preferably non-galvanized cold-rolled steel.

The aluminium alloy may, for example, be a zinc-aluminium alloy. The metal, especially steel, having a coating of an aluminium alloy may therefore, for example, be a metal, especially steel, having a zinc-aluminium coating. The zinc-aluminium coating on the metal, especially steel, can be obtained by standard hot-dip galvanization by a bath galvanization, except that the bath, in addition to zinc, also contains aluminium.

Examples of aluminium alloys are aluminium alloys with magnesium (aluminium 5000 or from the 5000 series), aluminium alloys with silicon (aluminium 6000 or from the 6000 series) and aluminium alloys with zinc (aluminium 7000 or from the 7000 series). The aluminium alloy is especially suitable as a substrate, but less suitable as a coating.

Magnesium is useful especially as a substrate.

The one-component heat-curing epoxy resin adhesive is applied to the first substrate, especially metal substrate, in step (a) of the method of the invention. This is effected, for example, at an application temperature of the adhesive of 10° C. to 80° C., preferably of 15° C. to 60° C., more preferably of 30 to 60° C. The application is preferably effected in the form of an adhesive bead. Automatic application is preferred.

The adhesive can be applied over the entire surface or over part of the surface of the first substrate, especially metal substrate. In a typical application, the adhesive can be applied, for example, only in an edge region of the substrate, especially metal substrate.

In a further step, the epoxy resin adhesive applied to the first substrate, especially metal substrate, is contacted with the second substrate, especially metal substrate, in order to form an adhesive bond.

To cure the epoxy resin adhesive in the adhesive bond, the adhesive is heated to a temperature in the range from 100 to 220° C., preferably 120 to 200° C. The heating can be effected, for example, by means of infrared radiation or induction heating or in an oven, for example a cathodic electrocoating oven. In this way, the adhesive bond with the cured epoxy resin adhesive is obtained.

The epoxy resin adhesive in the adhesive bond can be cured in one step, but curing in two or more steps is also possible, in which case intermediate operating steps between or during the curing steps are possible, for example a wash and/or a dip-coating operation, for example a cathodic electrocoating operation, of one or both substrates, especially metal substrates, with a subsequent wash.

The epoxy resin composition in the adhesive bond can be heated, for example, in a first step to a temperature of 100 to 130° C., preferably of 115 to 125° C., and in a second step to a temperature of 140-220° C., especially of 140-200° C., preferably between 160-190° C.

Further operating steps can be effected between the two steps, for example contacting with a wash liquid, for example at a temperature of 20 to 100° C., preferably 40 to 70° C., and/or dip-coating of one or both substrates, especially metal substrates, in a cathodic electrocoating bath, in which case the curing of the epoxy resin adhesive can be conducted in the second step, for example simultaneously with the curing of the dipcoat applied.

The one-component heat-curing epoxy resin adhesive of the invention and the method of the invention are especially suitable for bonding of substrates, especially metal substrates, for the manufacture of modes of transport, especially automobiles, buses, trucks, rail vehicles, ships or aircraft, or white goods, especially washing machines, tumble dryers or dishwashers, or parts thereof, preferably motor vehicles or installable components thereof.

A further aspect of the invention relates to an article comprising a cured adhesive bond, wherein the adhesive bond is obtainable by the method of the invention described above.

The article may, for example, be a mode of transport, especially an automobile, bus, truck, rail vehicle, ship or aircraft, or a white good, especially a washing machine, a tumble dryer or a dishwasher, or part of such an article. The article is preferably a motor vehicle or an installable component of a motor vehicle.

A further aspect of the invention relates to the use of the one-component heat-curing epoxy resin adhesive of the invention as described above for heat-resistant bonding of substrates, especially metal substrates, preferably metal substrates made of steel with a zinc-magnesium coating, hot-dip galvanized steel having a coating comprising a zinc sulphate and/or zinc hydroxysulphate, cold-rolled steel, aluminium, aluminium alloy or a metal, especially steel, having a coating of aluminium or an aluminium alloy.

The invention is illustrated further hereinafter by examples, but these are not intended to restrict the invention in any way.

EXAMPLES

In the examples, the following test methods were used for the testing of the particular properties:

Viscosity

Viscosity was measured by oscillographic means using a rheometer having a heatable plate (MCR 301, AntonPaar) (gap 1000 μm, measurement plate diameter: 25 mm (plate/plate), deformation 0.01 at 5 Hz, temperature: 20° C.–70° C., heating rate 10° C./min).

T-Peel Test

The determination is in line with ISO 11339. Peel strength was determined with the arrangement shown in FIG. 1 (dimensions in mm).

Substrate degreased with heptane and re-oiled with 3 g/m² of Anticorit PL 3802-39S (from Fuchs Schmierstoffe).

Adhesive thickness: 0.2 mm, spacers: glass beads
Baking: 25 min at 180° C.
Testing speed: 100 mm/min Cohesive Fracture/Adhesive Fracture Visual assessment of the fracture appearance obtained from the T-peel test, divided into CF and AF. CF=cohesive fracture (e.g. 100 CF=100% cohesive fracture), AF=adhesive fracture (e.g. 100 AF=100% adhesive fracture).

Carboxylic Acid Testing Examples (Steel 18-Steel 77)

The base formulation used was a formulation for a commercial one-component epoxy resin adhesive (Sika-Power®-493, from Sika Schweiz AG), to which was added in each case a carboxylic acid in a particular proportion as stated in Table 1 below (figures in % by weight and mmol of acid/100 g of adhesive). SikaPower®-493 contains an epoxy resin according to the above-elucidated formula (XI), a terminally blocked polyurethane prepolymer according to the above-elucidated formula (I) as impact modifier and dicyandiamide as hardener. As a reference, SikaPower®-493 without addition of carboxylic acid was tested (steel 1). The substrate used for the bonding test was ZM substrate (steel with zinc-magnesium coating) from ArcelorMittal. The examples of the adhesives obtained were referred to as steel 1, steel 18 etc. The T-peel test was determined as described above at a temperature of 80° C. The results are likewise stated in Table 1. Cured compositions which exhibit bubble formation are disadvantageous in that this leads to a reduction in the mechanical properties, especially in relation to tensile strength and tensile shear strength, and also to a decrease in impact resistance. To produce the adhesives, the components were mixed as follows:

Mixing (Steel 18-Steel 42)

The formulations were mixed on the basis of 50 g SikaPower®-493 in a Speedmixer (from Hauschild) with the following procedure:

1× program 1: 1 min, rising up to 1900 rpm, no vacuum, and

2× program 2: 1.5 min, rising up to 1900 rpm, under vacuum, with intermediate homogenization with a wooden spatula.

Examples (Steel 44-77)

The formulations (400 g) were mixed in a laboratory planetary mixer (Schramoid).

TABLE 1

| | % by weight of carboxylic acid | mmol* | T peel | Fracture appearance | Observations | Assessment |
|---|---|---|---|---|---|---|
| Steel 1 | No acid (reference) | — | 3.0 N/mm | 100AF | | reference |
| Steel 18 | 1.5% succinic acid | 12.7 | 5.1 N/mm | 90CF/10AF | | positive |
| Steel 19 | 1.0% succinic acid | 8.5 | 4.0 N/mm | 40CF/60AF | | positive |
| Steel 20 | 1.5% adipic acid | 10.3 | 4.7 N/mm | 80CF/20AF | | positive |
| Steel 21 | 1.5% oxalic acid dihydrate | 11.9 | 3.7 N/mm | 100CF | Bubbles | negative, decomposition |
| Steel 22 | 1.5% benzoic acid | 12.3 | 4.0 N/mm | 5CF/95AF | | negative, little effect |
| Steel 23 | 1.5% malonic acid | 14.4 | 5.0 N/mm | 100CF | Bubbles, brown discolouration | negative, decomposition |
| Steel 24 | 1.5% azelaic acid | 8.0 | 4.0 N/mm | 100AF | | negative, no effect |
| Steel 25 | 1.5% salicylic acid | 10.9 | 3.9 N/mm | 5CF/95AF | | negative, little effect |
| Steel 26 | 1.5% epoxysuccinic acid | 11.4 | 4.4 N/mm | 10CF/90AF | Colour change from blue to green, brown discolouration | burning |
| Steel 27 | 1.5% maleic acid | 12.9 | 4.0 N/mm | 5CF/95AF | Colour change from blue to green, brown discolouration | negative, burning |
| Steel 28 | 1.5% sebacic acid | 7.4 | 4.5 N/mm | 5CF/95AF | | negative, little effect |
| Steel 29 | 1.5% citric acid monohydrate | 7.1 | 4.5 N/mm | 100CF | Bubbles, colour change from blue to green, brown discolouration | negative, decomposition |
| Steel 30 | 1.5% stearic acid | 5.3 | 3.2 N/mm | 100AF | | negative, no effect |
| Steel 31 | 1.5% 2-hydroxysuccinic acid | 11.2 | 3.5 N/mm | 100AF | Brown discolouration | negative, burning |
| Steel 32 | 1.5% lauric acid | 7.5 | 4.0 N/mm | 10CF/90AF | | negative, little effect |
| Steel 33 | 1.5% succinic anhydride | 15.0 | 3.8 N/mm | 10CF/90AF | Brown discolouration | negative, little effect |
| Steel 35 | 1.0% oxalic acid dihydrate | 7.9 | 4.1 N/mm | 100CF | Bubbles, brown discolouration (a little) | negative, decomposition |
| Steel 36 | 0.5% oxalic acid dihydrate | 4.0 | 4.8 N/mm | 80CF/20AF | Bubbles | negative, decomposition |
| Steel 37 | 1.0% malonic acid | 9.6 | 4.5 N/mm | 30CF/70AF | Bubbles, brown discolouration (a little) | negative, decomposition |
| Steel 38 | 0.5% malonic acid | 4.8 | 4.3 N/mm | 10CF/90AF | | negative, little effect |
| Steel 39 | 1.0% citric acid monohydrate | 4.8 | 5.2 N/mm | 100CF | Bubbles, colour change from blue to green, brown discolouration (a little) | negative, decomposition |
| Steel 40 | 0.5% citric acid monohydrate | 2.4 | 4.7 N/mm | 60CF/40AF | Colour change from blue to green, brown discolouration (a little) | negative, decomposition |
| Steel 42 | 1.0% epoxysuccinic acid | 7.6 | 5.0 N/mm | 60CF/40AF | Colour change from blue to green, brown discolouration (a little) | burning |
| Steel 44 | 1.0% succinic acid | 8.5 | 5.5 N/mm | 90CF/10AF | | positive, good effect |

TABLE 1-continued

| | % by weight of carboxylic acid | mmol* | T peel | Fracture appearance | Observations | Assessment |
|---|---|---|---|---|---|---|
| Steel 45 | 1.0% malonic acid | 9.6 | 4.8 N/mm | 100CF | Bubbles, brown discolouration | negative, decomposition |
| Steel 46 | 0.75% epoxysuccinic acid | 5.7 | 4.6 N/mm | 100CF | Colour change from blue to green, brown discolouration (a little) | burning |
| Steel 47 | 0.5% malonic acid | 4.8 | 5.2 N/mm | 100CF | Bubbles | negative, decomposition |
| Steel 48 | 0.25% malonic acid | 2.4 | 5.0 N/mm | 90CF/10AF | Bubbles (a little) | negative, decomposition |
| Steel 49 | 0.4% epoxysuccinic acid | 3.0 | 4.6 N/mm | 80CF/20AF | Colour change from blue to green, brown discolouration (a little) | burning |
| Steel 50 | 0.5% succinic acid | 4.2 | 5.1 N/mm | 90CF/10AF | | positive, good effect |
| Steel 51 | 0.1% malonic acid | 1.0 | 3.9 N/mm | 100AF | | negative, no effect |
| Steel 52 | 1.0% EDTA** | 3.4 | 4.2 N/mm | 5CF/95AF | | negative, no effect |
| Steel 53 | 0.5% EDTA** | 1.7 | 3.4 N/mm | 100AF | | negative, no effect |
| Steel 54 | 0.25% EDTA** | 0.9 | 3.4 N/mm | 100AF | | negative, no effect |
| Steel 55 | 0.5% trimellitic acid | 2.4 | 4.2 N/mm | 75CF/25AF | | positive, good effect |
| Steel 56 | 0.25% trimellitic acid | 1.2 | 3.8 N/mm | 100AF | | |
| Steel 57 | 1.2% trimellitic acid | 5.7 | 4.8 N/mm | 95CF/5AF | | positive, good effect |
| Steel 58 | 1.5% phthalic acid | 9.0 | 5.1 N/mm | 90CF/10AF | | positive, good effect |
| Steel 59 | 1.5% terephthalic acid | 9.0 | 4.4 N/mm | 75CF/25AF | | positive, good effect |
| Steel 60 | 1.5% isophthalic acid | 9.0 | 5.2 N/mm | 90CF/10AF | | positive, good effect |
| Steel 63 | 1.0% isophthalic acid | 6.0 | 4.5 N/mm | 40CF/60AF | | positive, good effect |
| Steel 64 | 0.5% isophthalic acid | 3.0 | 3.8 N/mm | 95CF/5AF | | positive, good effect |
| Steel 72 | 1.5% oxalic acid (anhydrous) | 16.7 | 3.3 N/mm | 100CF | Bubbles, brown discolouration (slight) | negative, decomposition |
| Steel 73 | 1.5% suberic acid | 8.6 | 4.8 N/mm | 20CF/80AF | | negative, little effect |
| Steel 74 | 1.5% D-tartaric acid | 10.0 | 4.2 N/mm | 100AF | Brown discolouration | negative, burning |
| Steel 75 | 1.5% DL-tartaric acid | 10.0 | 4.1 N/mm | 100AF | Brown discolouration | negative, burning |
| Steel 76 | 1.5% 2-nitrobenzoic acid | 9.0 | 5.3 N/mm | 100CF | | Positive, good effect |
| Steel 77 | 1.5% gallic acid | 9.0 | 4.3 N/mm | 20CF/80AF | Bubbles, brown discolouration | Negative, decomposition, burning |

*mmol of carboxylic acid per 100 g of adhesive
**ethylenediaminetetraacetic acid Storage Stability Examples To test the influence of the amount of carboxylic acid on storage stability, the commercial one-component heat-curing epoxy resin adhesive used above (SikaPower®-493) was mixed with different amounts of succinic acid or isophthalic acid. The particular proportion of the carboxylic acid in the epoxy resin adhesives obtained is stated in % by weight and in mmol per 100 g of epoxy resin adhesive in Table 2 below.

The reference tested (steel 1) was the commercial epoxy resin adhesive without added carboxylic acid.

To test the storage stability, the viscosity of the adhesive obtained was determined at 25° C. and at 50° C. The viscosity was firstly measured immediately after the mixing with the carboxylic acid and secondly after storage at 60° C. for 7 days. The results are likewise listed in Table 2 below.

TABLE 2

| | Steel 1 | Steel 50 | Steel 69 | Steel 70 | Steel 71 | Steel 64 | Steel 60 | Steel 67 | Steel 68 |
|---|---|---|---|---|---|---|---|---|---|
| Succinic acid | | | | | | | | | |
| [% by wt.] | — | 0.5 | 1.5 | 5 | 10 | — | — | — | — |
| [mmol]* | — | 4.2 | 12.7 | 42.3 | 84.7 | — | — | — | — |
| Isophthalic acid | | | | | | | | | |
| [% by wt.] | — | — | — | — | — | 0.5 | 1.5 | 5 | 10 |
| [mmol]* | — | — | — | — | — | 3.0 | 9.0 | 30.1 | 60.2 |
| Viscosity at 25° C. | | | | | | | | | |
| [Pas] | 1650 | 1700 | 1740 | 1750 | 2130 | 1690 | 1770 | 1870 | 1930 |
| after 7 d at 60° C. | 1920 | 2770 | 9280 | cured | cured | 2580 | 5020 | cured | cured |
| Rise [%] | 16 | 63 | 433 | — | — | 53 | 184 | — | — |

TABLE 2-continued

|  | Steel 1 | Steel 50 | Steel 69 | Steel 70 | Steel 71 | Steel 64 | Steel 60 | Steel 67 | Steel 68 |
|---|---|---|---|---|---|---|---|---|---|
| Viscosity at 50° C. | | | | | | | | | |
| [Pas] | 639 | 662 | 655 | 639 | 791 | 681 | 698 | 713 | 685 |
| after 7 d at 60° C | 675 | 731 | 1760 | cured | cured | 764 | 992 | cured | cured |
| Rise [%] | 6 | 10 | 169 | — | — | 12 | 42 | — | — |

*mmol of carboxylic acid per 100 g of adhesive

Bonding Examples

Steel 1

The reference used was the commercial one-component heat-curing epoxy resin adhesive used above (SikaPower®-493).

Steel 60

A one-component heat-curing epoxy resin adhesive was produced by adding isophthalic acid to the adhesive Steel 1 in order to obtain an epoxy resin adhesive having 1.5% by weight of isophthalic acid or 9.0 mmol per 100 g of adhesive.

The epoxy resin adhesives Steel 1 and Steel 60 were tested on the following steel sheets or aluminium sheets:

| DC04 | DC04 + ZE 75/75 AO 0.8 mm | electrolytically galvanized steel sheet |
|---|---|---|
| DC06 | DC06 + ZE 75/75 APO 0.8 mm | electrolytically galvanized and phosphated steel sheet |
| DX56D | DX56D + Z100 MBO 0.8 mm | hot-dip galvanized steel sheet |
| ZM | DX54 + ZM120, 0.75 mm | steel sheet with zinc-magnesium coating |
| NIT | NIT, ArcelorMittal, 0.8 mm | galvanized steel sheet treated by the NIT method (zinc sulphate/zinc hydroxysulphate coating) |
| CRS | CRS, 1.2 mm | cold-rolled steel sheet, non-galvanized |
| AC170 | AC 170 (AA6016 + TiZr), 1.0 mm | aluminium with conversion layer |

All substrates were degreased with heptane beforehand and oiled with 3 g/m² of oil (Anticorit PL 3809-39S).

The adhesives Steel 1 and Steel 60 were each applied to the pretreated substrates, provided with glass beads (0.2 mm), joined and then cured at 180° C. for 25 min.

The bonding of the adhesives on the substrates was then assessed at temperatures of 23° C. and 80° C. by means of a T-peel test at a speed of 100 mm/min and determining the fracture appearance. The results are shown in the two tables, Tables 3 and 4, below. In the tables:

CF=cohesive fracture (100 CF=100% cohesive fracture)
AF=adhesive fracture (100 AF=100% adhesive fracture)
Loss [%]: reduction in T-peel at 80° C. compared to the T-peel at 23° C. in percent.

The results on all substrates show a smaller reduction in T-peel at 80° C. compared to the T-peel at 23° C. for Steel 60 compared to Steel 1.

On the substrates ZM, NIT and CRS, the adhesion of Steel 60 is better than that of Steel 1. More particularly, the adhesion of Steel 60 on ZM is good at 80° C., whereas inadequate adhesion is achieved with Steel 1.

TABLE 3

Determination at 23° C.

|  | DC04 | DC06 | DX56D | ZM | NIT | AC170 | CRS |
|---|---|---|---|---|---|---|---|
| Steel 1 | | | | | | | |
| T-peel strength [N/mm] | 6.6 +/− 0.1 | 7.4 +/−0.6 | 8.4 +/− 0.4 | 7.0 +/− 0.2 | 7.7 +/− 0.1 | 6.1 +/− 0.3 | 13.1 +/− 0.5 |
| Fracture appearance | 100CF | 100CF | 100CF | 100CF | 100CF | 100CF | 100CF |
| Steel 60 | | | | | | | |
| T-peel strength [N/mm] | 6.2 +/− 0.2 | 5.9 +/− 0.4 | 6.6 +/− 0.2 | 6.0 +/− 0.1 | 6.9 +/− 0.6 | 4.8 +/− 0.4 | 12.5 +/− 0.7 |
| Fracture appearance | 100CF | 100CF | 100CF | 100CF | 100CF | 100CF | 100CF |

TABLE 4

Determination at 80° C.

|  | DC04 | DC06 | DX56D | ZM | NIT | AC170 | CRS |
|---|---|---|---|---|---|---|---|
| Steel 1 | | | | | | | |
| T-peel strength [N/mm] | 5.7 +/− 0.1 | 5.7 +/− 0.2 | 6.4 +/− 0.2 | 3.0 +/− 0.2 | 5.3 +/− 0.1 | 5.5 +/− 0.1 | 9.5 +/− 0.7 |
| Loss [%] | 14 | 23 | 24 | 59 | 31 | 10 | 27 |
| Fracture appearance | 100CF | 100CF | 100CF | 100AF | 100CF | 100CF | 50CF/50AF |
| Steel 60 | | | | | | | |
| T-peel strength [N/mm] | 5.8 +/− 0.2 | 5.2 +/− 0.2 | 5.8 +/− 0.2 | 5.2 +/− 0.2 | 6.1 +/− 0.2 | 5.3 +/− 0.3 | 10.7 +/− 0.1 |
| Loss [%] | 6 | 12 | 12 | 30 | 12 | −15 | 14 |
| Fracture appearance | 100CF | 100CF | 100CF | 20CF/80AF | 100CF | 100CF | 90CF/10AF |

The invention claimed is:
1. One-component heat-curing epoxy resin adhesive comprising
   a) at least one epoxy resin having an average of more than one epoxy group per molecule;
   b) at least one latent hardener for epoxy resins; and
   c) at least one carboxylic acid selected from substituted or unsubstituted nitrobenzoic acid,
   wherein the epoxy resin adhesive contains 0.009 to 0.04 mol of the at least one carboxylic acid per 100 g of the epoxy resin adhesive and the epoxy resin adhesive has a viscosity of 500-5000 Pas at 25° C., wherein the viscosity is determined by oscillographic means using a rheometer having a heatable plate (MCR 301, Anton-Paar) (1000 μm gap, measurement plate diameter: 25 mm (plate/plate), deformation 0.01 at 5 Hz, temperature: 25° C.).

2. The one-component heat-curing epoxy resin adhesive according to claim 1, wherein the epoxy resin adhesive contains 0.009 to 0.03 mol of the at least one carboxylic acid per 100 g of the epoxy resin adhesive.

3. The one-component heat-curing epoxy resin adhesive according to claim 1, wherein the epoxy resin adhesive contains 0.009 to 0.02 mol of the at least one carboxylic acid per 100 g of the epoxy resin adhesive.

4. The one-component heat-curing epoxy resin adhesive according to claim 1, further comprising at least one terminally blocked polyurethane prepolymer.

5. The one-component heat-curing epoxy resin adhesive according to claim 4, wherein the at least one terminally blocked polyurethane prepolymer has the formula (I);

where $R^1$ is a p-valent radical of a linear or branched polyurethane prepolymer terminated by isocyanate groups after the removal of the terminal isocyanate groups;
p is a value from 2 to 8; and
$R^2$ is independently a substituent selected from the group consisting of

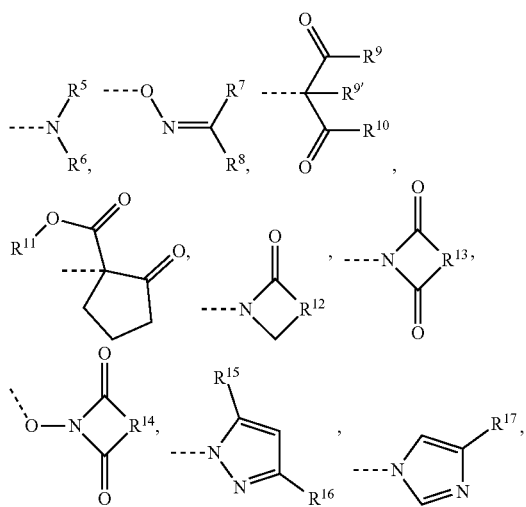

-continued

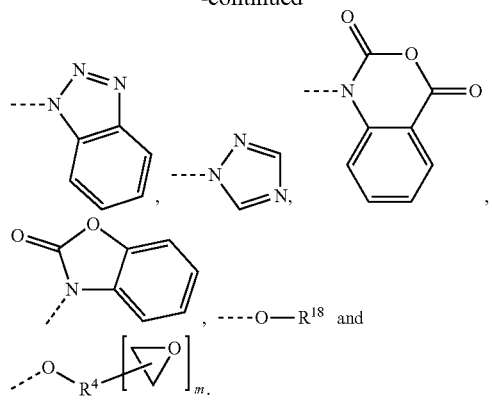

where
$R^5$, $R^6$, $R^7$ and $R^8$ are each independently an alkyl or cycloalkyl or aralkyl or arylalkyl group or $R^5$ together with $R^6$, or $R^7$ together with $R^8$, form part of a 4- to 7-membered ring which is optionally substituted;
$R^9$, $R^{9'}$ and $R^{10}$ are each independently an alkyl or aralkyl or arylalkyl group or an alkyloxy or aryloxy or aralkyloxy group;
$R^{11}$ is an alkyl group,
$R^{12}$, $R^{13}$ and $R^{14}$ are each independently an alkylene group having 2 to 5 carbon atoms, which optionally has double bonds or is substituted, or a phenylene group or a hydrogenated phenylene group;
$R^{15}$, $R^{16}$ and $R^{17}$ are each independently H or an alkyl group or an aryl group or an aralkyl group; and
$R^{18}$ is an aralkyl group or a mono- or polycyclic substituted or unsubstituted aromatic group optionally having aromatic hydroxyl groups;
$R^4$ is a radical of an aliphatic, cycloaliphatic, aromatic or araliphatic epoxide containing a primary or secondary hydroxyl group after the removal of the hydroxyl and epoxy groups;
and m is a value of 1, 2 or 3.

6. The one-component heat-curing epoxy resin adhesive according to claim 1, further comprising at least one filler.

7. The one-component heat-curing epoxy resin adhesive according to claim 1, further comprising at least one liquid rubber and/or at least one toughness improver.

8. The one-component heat-curing epoxy resin adhesive according to claim 1, wherein the epoxy resin adhesive has a viscosity between 1000 Pas and 3000 Pas at 25° C.

9. The one-component heat-curing epoxy resin adhesive according to claim 1, wherein the latent hardener is selected from dicyandiamide, guanamines, guanidines, aminoguanidines and derivatives thereof, substituted ureas, imidazoles and amine complexes.

10. The one-component heat-curing epoxy resin adhesive according to claim 1, wherein the at least one carboxylic acid is the unsubstituted nitrobenzoic acid.

11. The one-component heat-curing epoxy resin adhesive according to claim 10, wherein the epoxy resin adhesive contains 0.009 to 0.02 mol of the unsubstituted nitrobenzoic acid per 100 g of the epoxy resin adhesive.

12. The one-component heat-curing epoxy resin adhesive according to claim 11, wherein the at least one carboxylic acid is 2-nitrobenzoic acid, and the epoxy resin adhesive contains 0.009 of the 2-nitrobenzoic acid per 100 g of the epoxy resin adhesive.

13. The one-component heat-curing epoxy resin adhesive according to claim 1, wherein the at least one carboxylic acid is 2-nitrobenzoic acid.

14. Method of bonding substrates, comprising the steps of
   a) applying a one-component heat-curing epoxy resin adhesive according to claim 1 to a first substrate;
   b) contacting the epoxy resin adhesive applied with a second substrate, to form an adhesive bond; and
   c) curing the epoxy resin adhesive in the adhesive bond at a temperature in the range from 100 to 220° C.

15. Method according to claim 14, wherein the first metal substrate and/or the second metal substrate is selected from steel having a zinc-magnesium coating, hot-dip galvanized steel having a coating comprising zinc sulphate and/or zinc hydroxysulphate, cold-rolled steel, magnesium, aluminium, aluminium alloy, metal substrates having a forming aid as coating or a metal having a coating of aluminium or an aluminium alloy.

16. Method according to claim 14, wherein the first metal substrate and/or the second metal substrate is composed of steel having a zinc-magnesium coating.

\* \* \* \* \*